(12) United States Patent
Smet (10) Patent No.: US 8,386,941 B2
(45) Date of Patent: Feb. 26, 2013

(54) USER INTERFACE LOCALIZATION CONFLICT INDICATION

(75) Inventor: Bart De Smet, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1050 days.

(21) Appl. No.: 12/147,575

(22) Filed: Jun. 27, 2008

(65) Prior Publication Data
US 2009/0327925 A1 Dec. 31, 2009

(51) Int. Cl.
*G06F 3/048* (2006.01)
(52) U.S. Cl. ............... 715/764; 715/859; 715/774
(58) Field of Classification Search .......... 715/764, 715/859, 774
See application file for complete search history.

(56) References Cited

U.S. PATENT DOCUMENTS

| | | | |
|---|---|---|---|
| 6,366,299 B1 | 4/2002 | Lanning et al. | |
| 7,013,284 B2 * | 3/2006 | Guyan et al. | 705/4 |
| 7,149,759 B2 * | 12/2006 | Morrison | 1/1 |
| 7,707,496 B1 * | 4/2010 | Moore et al. | 715/254 |
| 8,214,768 B2 * | 7/2012 | Boule et al. | 715/863 |
| 2002/0015064 A1 * | 2/2002 | Robotham et al. | 345/863 |
| 2002/0124006 A1 * | 9/2002 | Parnell et al. | 707/102 |
| 2006/0031776 A1 | 2/2006 | Glein et al. | |
| 2007/0168859 A1 | 7/2007 | Fortes | |
| 2007/0209019 A1 | 9/2007 | Kaval et al. | |
| 2007/0214430 A1 | 9/2007 | Coutts | |
| 2007/0260503 A1 | 11/2007 | Pan et al. | |
| 2007/0266151 A1 | 11/2007 | Friedland et al. | |
| 2009/0327925 A1 * | 12/2009 | Smet | 715/762 |

OTHER PUBLICATIONS

"The Screen Real Estate Problem", Retrieved at<<http://pages.cpsc.ucalgary.ca/~sheelagh/personal/thesis/ch2.pdf>>, pp. 19-60.
Taivalsaari Antero, "The Event Horizon User Interface Model for Small Devices", Retrieved at<<http://citeseer.ist.psu.edu/cache/papers/cs/23360/http:zSzzSzwww.sun.comzSzresearchzSztechrepzSz1999zSzsmli__tr-99-74.pdf/taivalsaari99event.pdf>>, Mar. 1999, pp. 25.
"Usability Glossary: Screen Real Estate", Retrieved at<<http://www.usabilityfirst.com/glossary/term__573.txl>>, Apr. 24, 2008, pp. 2.
Berkun Scott, "The Explorer Bar: Unifying and Improving Web Navigation", Retrieved at<<http://www.scottberkun.com/wp-content/uploads/2007/03/interact99.pdf>>, pp. 8.

* cited by examiner

*Primary Examiner* — David Phantana Angkool

(57) ABSTRACT

A method for indicating localization conflicts. The method includes receiving information about a first graphical user interface element and receiving information about a second graphical user interface element. Localization data associated with the first graphical user interface element and the second graphical user interface element is accessed. A determination is made as to if there is a conflict between the first graphical user interface element and the second graphical user interface element. An indication of the results of the determining of whether there is a conflict between the first graphical user interface element and the second graphical user interface element is displayed.

20 Claims, 7 Drawing Sheets

USER INTERFACE LOCALIZATION CONFLICT INDICATION

BACKGROUND

The widespread use and rapid development of the computer technology has allowed software applications to be released to a global market. In order to prepare a software application for global release, a developer needs to configure localization information such as languages and/or dialects that the application will use. Each localization may take up more space as the number of characters and the type of characters changes from language to language.

Conventionally, designing the graphical user interface of an application to support different localizations requires a developer to design the user interface and then view the different localizations by viewing the user interface at run time. Unfortunately, this can quickly become time consuming as each localization needs to be viewed and checked for user interface conflicts such as overlaps. For example, two strings near each other may overlap when the strings are converted to Dutch as the corresponding strings in Dutch use more characters.

One conventional solution has been to take the English string length and multiple it by some factor, such as 2.5, to approximate the space taken by each localized string. This approach can assist in reducing user interface element conflicts but does not remove the need to check the graphical user interface during run time for localization conflicts.

Thus, what is needed is a way to indicate localization conflicts during design time.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, visualizing localization conflicts. It involves various techniques for indicating screen space usage including indicating localization conflicts. The indications of screen space usage are updated as a graphical user interface is designed. Therefore, the technology allows graphical user interface designer to see in real time localization conflicts as graphical user interface elements are manipulated.

In one implementation, a method for indicating localization conflicts is used to indicate localization conflicts during graphical user interface design. Information (e.g., alignment and placement data) about a first graphical user interface element and information about a second graphical user interface element may be received and corresponding localization data is accessed. A determination is made as to if there is a conflict between the first graphical user interface element and the second graphical user interface element. An indication of the results of the determining of whether there is a conflict between the first graphical user interface element and the second graphical user interface element is displayed.

Techniques described herein provide a way for indicating localization conflicts during graphical user interface design. Thus, users are able to design a graphical user interface without having to check for localization conflicts at runtime.

BRIEF DESCRIPTION OF THE DRAWINGS

The accompanying drawings, which are incorporated in and form a part of this specification, illustrate embodiments and, together with the description, serve to explain their principles.

DETAILED DESCRIPTION

Reference will now be made in detail to the embodiments of the claimed subject matter, examples of which are illustrated in the accompanying drawings. While the invention will be described in conjunction with the embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail so as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Overview

Described herein is technology for, among other things, visualizing localization conflicts. It involves various techniques for indicating screen space usage including indicating localization conflicts. The indications of screen space usage are updated as a graphical user interface is designed. Therefore, the technology allows graphical user interface designer to see in real time localization conflicts as graphical user interface elements are manipulated.

In one implementation, a method for indicating localization conflicts is used to indicate localization conflicts during graphical user interface design. Information (e.g., alignment and placement data) about a first graphical user interface element and information about a second graphical user interface element may be received and corresponding localization data is accessed. A determination is made as to if there is a conflict between the first graphical user interface element and the second graphical user interface element. An indication of the results of the determining of whether there is a conflict between the first graphical user interface element and the second graphical user interface element is displayed.

Techniques described herein provide a way for indicating localization conflicts during graphical user interface design. Thus, users are able to design a graphical user interface without having to check for localization conflicts at runtime.

Example Graphical User Interface and Elements

Figure 1:
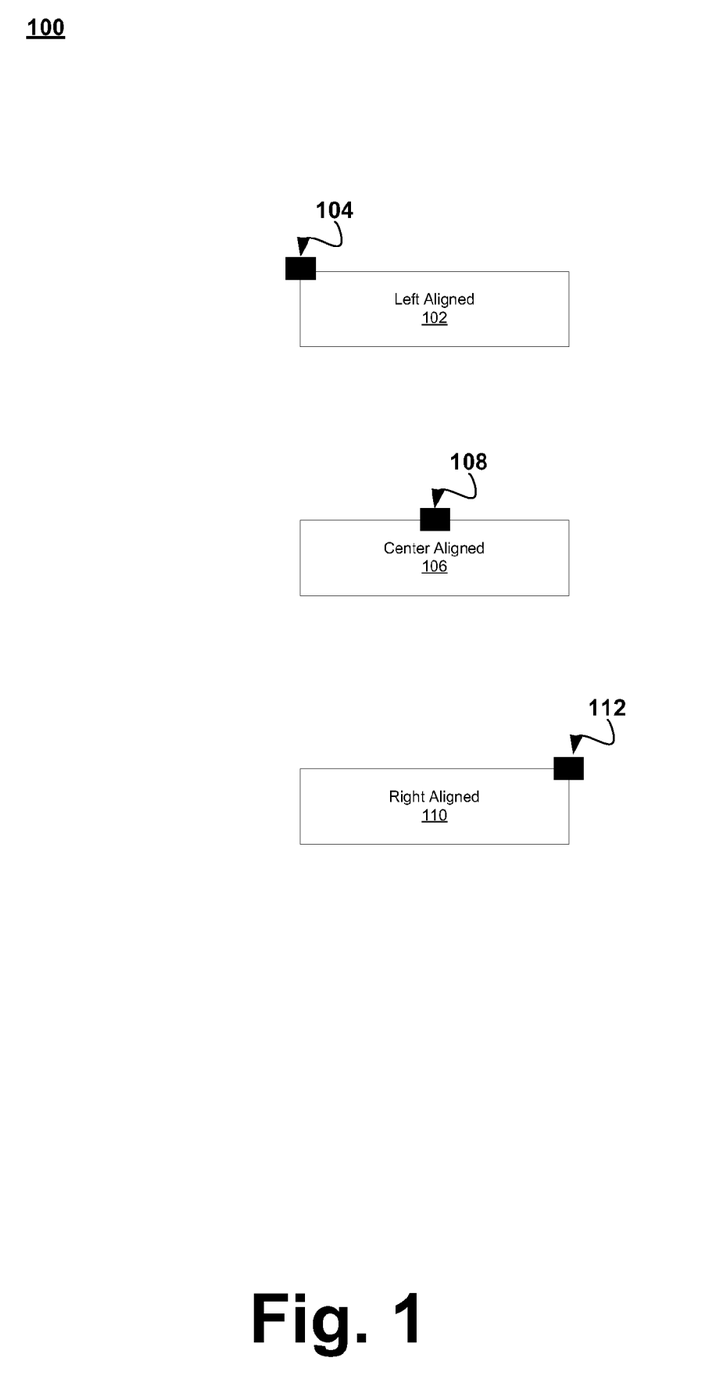
FIG. 1 is a block diagram of exemplary graphical user interface elements, in accordance with an embodiment.

FIG. 1 shows a block diagram of exemplary graphical user interface elements, in accordance with an embodiment. The graphical user interface (GUI) elements of block diagram 100 may be part of a light weight user interface framework not having features including text wrapping, floating controls, docking or anchoring. It is appreciated embodiments may support a variety of user interface frameworks including, but not limited to, those having rich support for text wrapping, floating controls, docking or anchoring. The graphical user interface elements described herein are exemplary and the discussion herein is not to limit the different types of graphical user interface elements that embodiments support. It is appreciated that graphical user interface elements may be any of a variety of graphical user interface elements including, but not limited to, buttons, captions, labels, images, animations, or video.

Information corresponding to each GUI element may include X and Y coordinates and alignment data. The X and Y coordinates may correspond to fixed points 104, 108, and 112. The alignment of GUI element 102 may be relative to fixed point 104 as specified by the X and Y coordinates. The rendered text (or image) of GUI elements 102, 106, and 110 is positioned based on the fixed point and the alignment. This allows for localization resources to be rendered correctly despite their length which varies from culture to culture.

GUI element 102 shows a left aligned user interface elements. The left alignment of GUI element 102 grows from left to right as the number of characters or image size changes with localization. For example, GUI element 102 will expand toward the right as languages used include more and more characters or larger images.

GUI element 106 is center aligned meaning that GUI element 106 will grow in both directions (e.g., left and right and with equal speed in both directions to preserve symmetry) as more characters or larger images are used to localized GUI element 106. GUI element 110 is right aligned and will grow from right to left as more characters or larger images are used to localize GUI elements 110.

Figure 2:
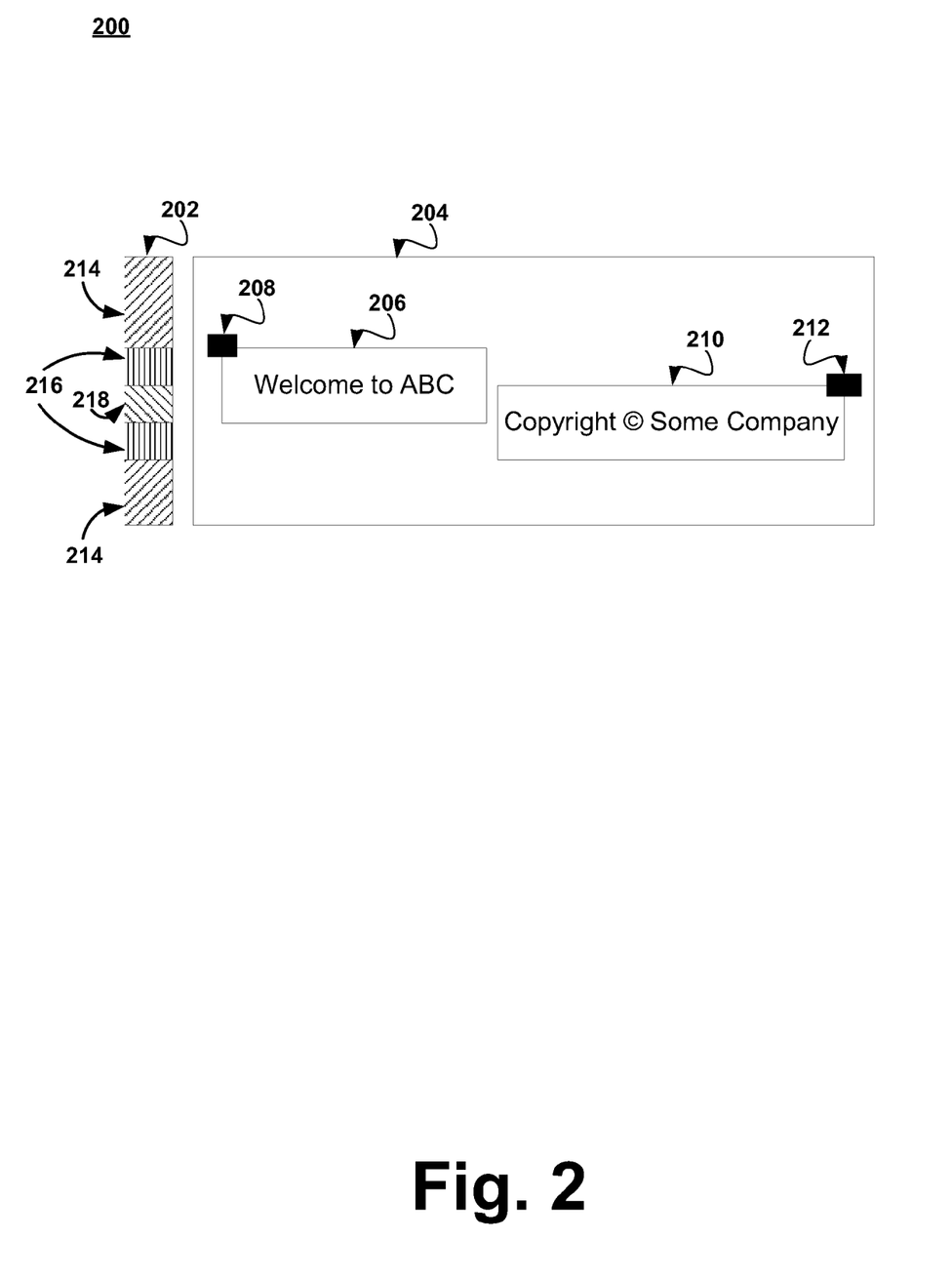
FIG. 2 is a block diagram of exemplary graphical user interface, in accordance with an embodiment.

FIG. 2 shows a block diagram of exemplary graphical user interface, in accordance with an embodiment. Graphical user interface (GUI) 200 may be used to design graphical user interfaces for a variety of applications. Embodiments as described herein may be integrated into a variety of application, including but not limited to, installation design applications, application design interfaces, web design interfaces, and the like. GUI 200 includes localization conflict indicator 202 and GUI design area 204.

GUI design area 204 includes exemplary GUI elements 206 and 210. GUI element 206 is left aligned and includes the text "Welcome to ABC." GUI element 206 has fixed point 208 which may be stored as X and Y coordinates. GUI element 210 is right aligned and includes the text "Copyright© Some Company". GUI element 210 has fixed point 212 which may be stored as X and Y coordinates.

Localization conflict indicator 202 may be a design-time screen real estate visualization tool to help detecting GUI real estate conflicts when dragging controls around with the mouse. Localization conflict indicator 202 may thus indicate real time conflicts among GUI elements (e.g., GUI elements 206 and 210) by various colors or patterns. The colors indicated by localization conflict indicator 202 may be based on analysis of the strings and corresponding localization data to determine what the width will need to be. The indications on localization conflict indicator 202 may also reflect checking of fonts, font sizes, and specific characters a localization (e.g., accent marks).

As depicted localization conflict indicator 202 includes areas 214, 216, and 218. Areas 214, 216, and 218 vary with location of GUI elements (e.g., GUI elements 206 and 210) and localization conflicts. Area 214 reflects the corresponding areas (e.g., horizontal area, strip, or portion in a corresponding vertical span) of GUI design area 204 are unoccupied by controls or GUI elements. Area 214 may be colored as green to indicate that GUI elements may be placed into the corresponding areas of GUI design area 204.

Area 216 reflects the corresponding areas of GUI design area 204 that are occupied by GUI elements but do not have localization conflicts. Area 216 may be colored as yellow to indicate that GUI elements placed in the corresponding areas of GUI design area 204 may create conflicts.

Area 218 reflects the corresponding areas of GUI design area 204 that include localization conflicts. Based on accessing localization information GUI element 206 may grow to the right as the contents of GUI element 206 are localized and thus overlap with GUI element 210. GUI element 210 may grow to the left as the content of GUI element 210 are localized and thus overlap with GUI element 206. Area 218 may be colored as red to indicate that GUI elements (e.g., GUI elements 210 and 206) are in conflict.

Figure 3:
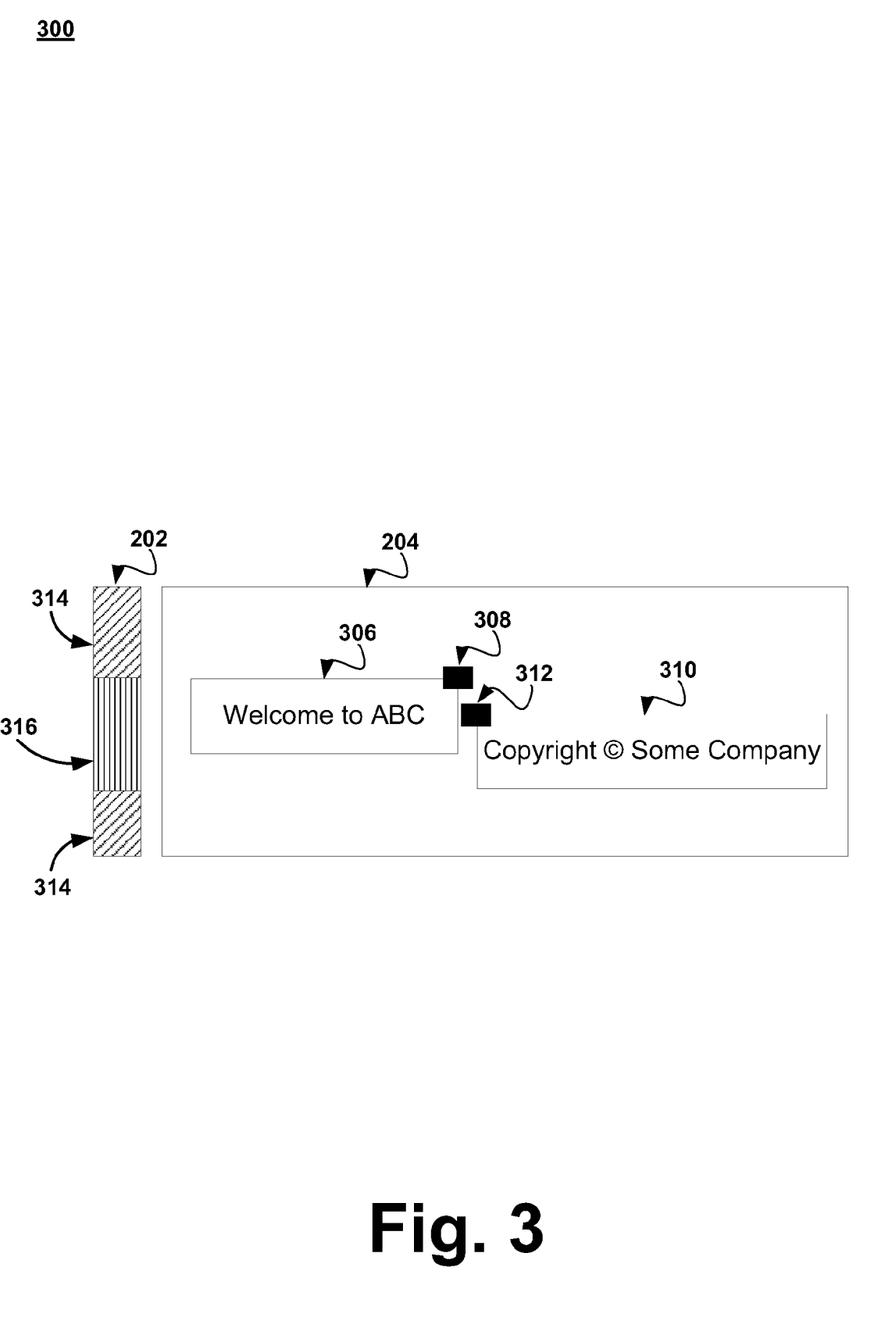
FIG. 3 is a block diagram of exemplary graphical user interface, in accordance with an embodiment.

FIG. 3 shows a block diagram of exemplary graphical user interface, in accordance with an embodiment. Graphical user interface 300 may be used for GUI design. Graphical user interface 300 includes localization conflict indicator 202 and graphical user interface (GUI) design area 204.

GUI design area 204 includes right aligned GUI element 306 and left aligned GUI element 308. GUI element 306 includes fixed point 308 and GUI element 308 includes fixed point 312.

Localization conflict indicator 202 includes areas 314 and 316. Area 314 indicates the corresponding areas of GUI design area 204 that are unoccupied by controls or GUI elements. Area 316 indicates the corresponding areas of GUI design area 204 that are occupied by GUI elements 306 and 310 but do not have localization conflicts.

Due to the alignments of GUI element 306 and GUI element 308, both GUI elements will grow in opposite directions and GUI elements 306 and GUI element 308 may overlap in a vertical direction. Thus, localization conflict indicator 202 is may detect non-conflicts due to alignments in opposite directions even though there is overlap in a vertical direction.

It is appreciated that a conflict localization indicator substantially similar to localization conflict indicator 202 may be placed along the bottom of GUI design 204 as described herein to indicate localization conflicts in a vertical direction.

Example System

Figure 4:
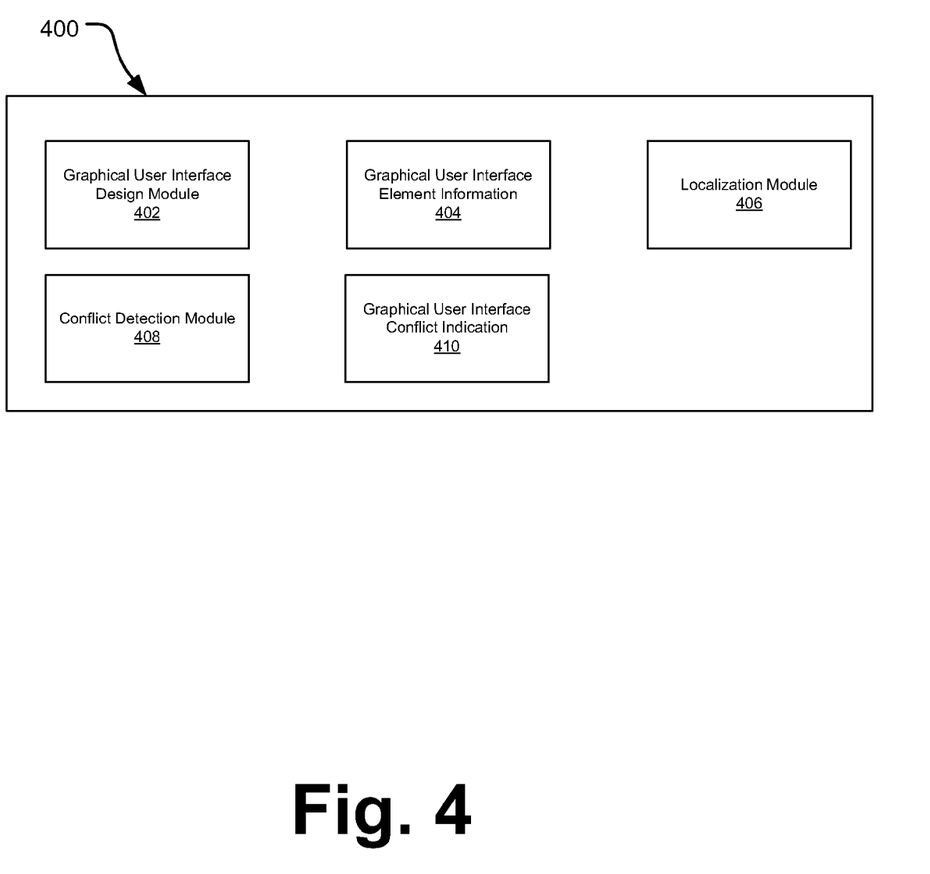
FIG. 4 is a block diagram of an exemplary system for facilitating design of a graphical user interface, in accordance with an embodiment.

The following discussion sets forth details of the present technology systems for facilitating graphical user interface design. FIG. 4 illustrates example components used by various embodiments of the present technology. System 400 includes components or modules that, in various embodiments, are carried out by a processor under the control of computer-readable and computer-executable instructions. The computer-readable and computer-executable instructions reside, for example, in data storage features such as computer usable memory 704, removable storage 708, and/or non-removable storage 710 of FIG. 7. The computer-readable and computer-executable instructions are used to control or operate in conjunction with, for example, processing unit 702 of FIG. 7. It should be appreciated that the aforementioned components of system 400 can be implemented in hardware or software or in a combination of both. Although specific components are disclosed in system 400 such components are examples. That is, embodiments are well suited to having various other components or variations of the components recited in system 400. It is appreciated that the components in system 400 may operate with other components than those presented, and that not all of the components of system 400 may be required to achieve the goals of system 400.

FIG. 4 is a block diagram of an exemplary system 400 for facilitating design of a graphical user interface, in accordance with an embodiment. System 400 includes graphical user interface (GUI) design module 402, GUI element information module 404, localization module 406, conflict detection module 408, and GUI conflict indication module 410.

GUI design module 402 presents a graphical user interface for designing a graphical user interface for an application. The GUI presented by GUI design module 402 may include a localization conflict indicator (e.g., localization conflict indicator 202) and an area for designing a GUI (e.g., GUI design area 204). A designer may thus select GUI elements from a library of GUI elements to be placed with in the area for designing a GUI. GUI design module 402 may further facilitate graphical user interface design via a master template for setting various GUI parameters including to be applied across one or more screens or windows. The parameters may include, but not limited to, decoration or borders on windows. For example, the GUI could be designed to have a border icon at the bottom right of a each window of the application.

GUI element information module 404 may store information associated with selected GUI elements. As described herein, the information associated with selected GUI elements may include alignment data (e.g., right, left, and center) and coordinate data (e.g. X and Y coordinates).

Localization module 406 stores localization information associated with the selected GUI elements. The localization information may include translations of strings or images, etc. into the corresponding languages or dialects to be used within the application. Localization module 406 may further facilitate display of localized GUI elements based on the localization information for a designer to view the localized GUI.

Conflict detection module 408 detects localization conflicts between the selected GUI elements. Conflict detection module 408 may access the information of localization module 406 to determine whether there are conflicts between GUI elements (e.g., overlapping). Conflict detection module 408 may detect conflicts by evaluating the width of each GUI element corresponding to each localization of the GUI element. Conflict detection module 408 may further detect conflicts between a graphical user interface element and a master template graphical user interface element.

GUI conflict indication module 410 indicates one or more conflicts between selected GUI elements. The conflicts may be indicated in a variety of ways including, but not limited to, graphical means (e.g., localization conflict indicator 202 or graphical marking on the GUI elements in conflict) or via a message box. The conflicts further may be indicated during mouse operations (e.g., dragging a control around indicates the possible conflicts as opposed to running build-time tools). GUI conflict indication module 410 may also indicate which localization is responsible for the conflict. For example, if the localization of a label in Dutch causes a conflict, an indication the Dutch localization results in a conflict may be displayed.

Example Operations

Figure 5:
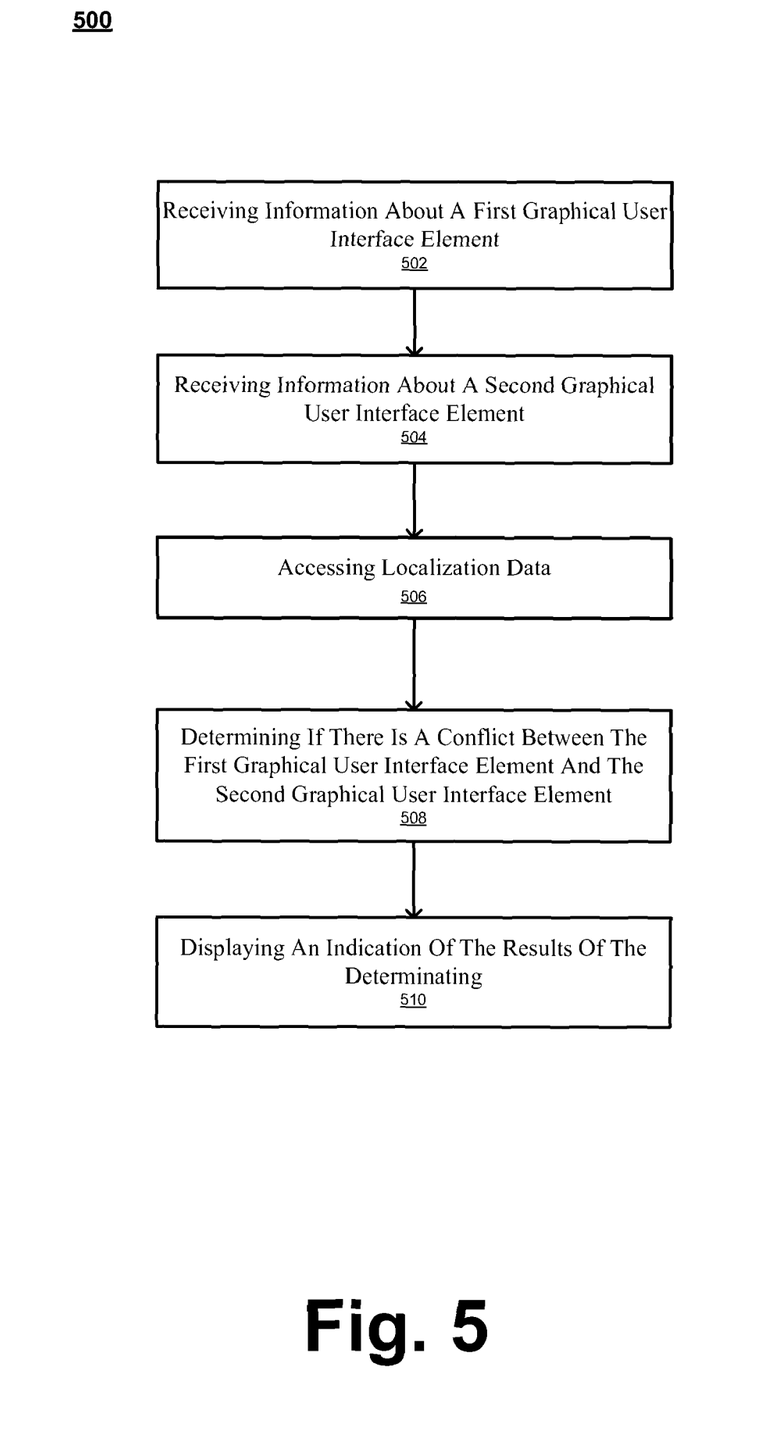
FIG. 5 is a flowchart of an exemplary process for indicating localization conflicts, in accordance with an embodiment.
Figure 6:
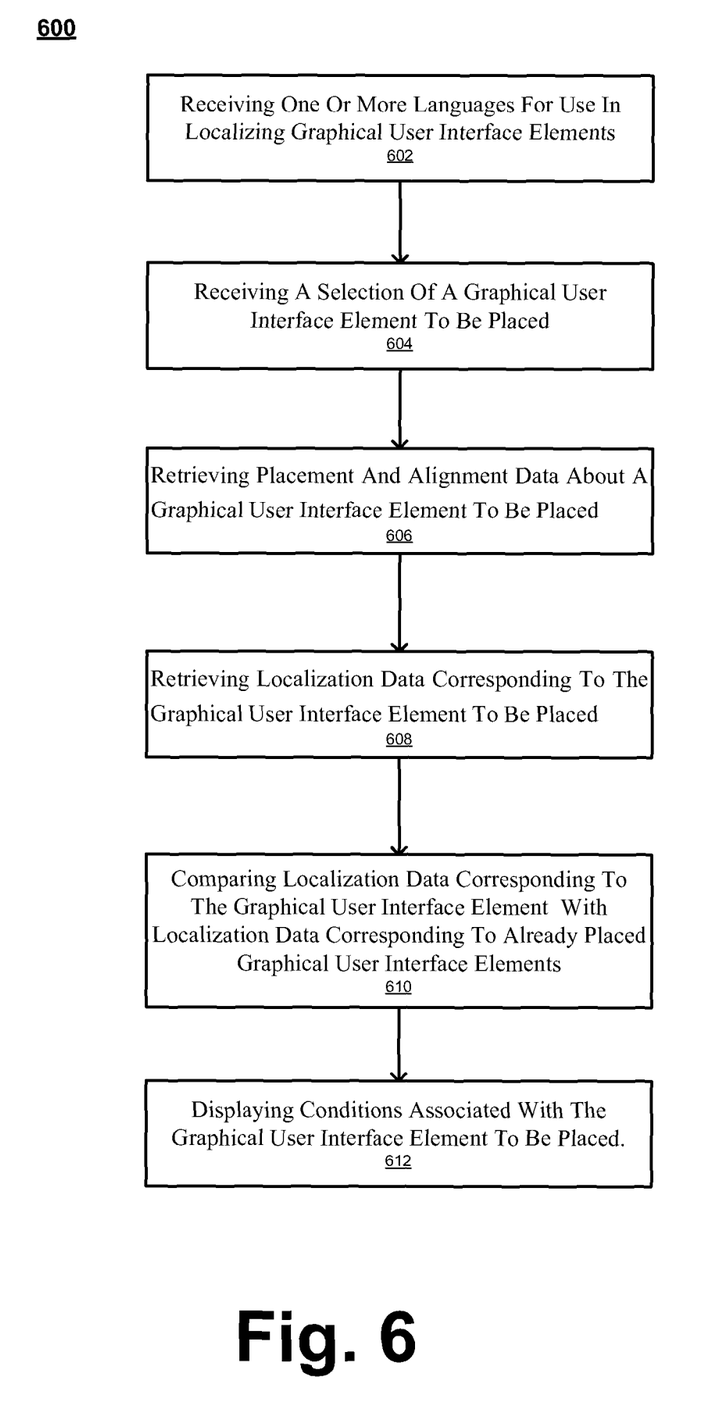
FIG. 6 is a flowchart of an exemplary process for indicating usage of screen space, in accordance with an embodiment.

The following discussion sets forth in detail the operations of the present technology for accessing health information. With reference to FIGS. 5 and 6, flowcharts 500 and 600 each illustrate example blocks used by various embodiments of the present technology. Flowcharts 500 and 600 include processes that, in various embodiments, are carried out by a processor under the control of computer-readable and computer-executable instructions.

FIG. 5 is a flowchart of an exemplary process for indicating localization conflicts, in accordance with an embodiment. The process of flowchart 500 may be carried out in conjunction with a graphical user interface (e.g., GUI 200) any by a GUI design system (e.g., system 400).

At block 502, information about a first graphical user interface (GUI) element is received. As described herein the information about the GUI elements may include placement information including coordinates and alignment information. The GUI elements may be a variety of GUI elements including, but not limited to, an image, button, caption, label, text box, animation, or video.

For example, the first GUI element may have some text in a logo such as "Some Software 2.0 Professional Edition". The localization of the "professional edition" text, may vary the width of the image and thereby impact the horizontal space occupied by the logo causing the logo to conflict with a string or other graphical user element item. It is appreciated that the logo is not necessarily growing but being replaced with images of a different size. A fixed point of the image (e.g., top left and X and Y coordinates) may be used to determine where the image is and what direction the image can occupy.

At block 504, information about a second graphical user interface (GUI) element is received. The second GUI element may be a variety of different types of GUI elements as described herein. The information about the second GUI element may include alignment and placement information as described herein.

At block 506, localization data associated with the first GUI element and the second GUI element is accessed. As described herein, the localization data may include the languages and dialects to be supported by an application corresponding to the first and the second GUI elements.

At block 508, a determination is made as to if there is a conflict between first graphical user interface element and second graphical user interface element. As described herein, a conflict may be determined based on a horizontal localization conflict check (e.g., checking for conflicts based on growth in GUI elements in the left and right directions) or based on a vertical localization conflict check (e.g., checking for conflicts based on growth in GUI elements in the up and down directions).

At block 510, an indication of the results of the determining of whether there is a conflict between the first GUI element and the second GUI element is displayed. As described herein, the displaying may include indicating a horizontal localization conflict on a vertical GUI element (e.g., localization conflict indicator 202). The displaying may also include indicating a vertical localization conflict on a horizontal graphical user element.

FIG. 6 shows a flowchart of an exemplary process for indicating usage of screen space, in accordance with an embodiment. The process of flowchart 600 may be carried out in a computer system having a graphical user interface including a display and a user interface selection device.

At block 602, one or more languages for use in localizing GUI elements are received. The languages to be supported may be selected prior to designing of a graphical user interface. Languages may also be selected after a graphical user interface has been designed to view the various localizations corresponding to each language. For example, a graphical user interface design could include buttons or other selectable GUI elements to allow display of each localization. Embodiments may further allow the addition of languages after the graphical user interface is designed without requiring a redesign.

At block 604, a selection of a graphical user interface element to be placed is received. As described herein, the GUI element may be selected for placement in an area for GUI design (e.g., GUI design area 204).

At block 606, placement and alignment data about the GUI element to be placed is retrieved. As described herein, GUI elements may include information including a fixed point (e.g., X and Y coordinates) and alignment information (e.g., left, right, or center aligned).

At block 608, localization data corresponding to the GUI element to be placed is retrieved. As described herein, the localization information may include width and height information of localized versions of the GUI element.

At block 610, localization data corresponding to the GUI element is compared with localization data corresponding to already placed graphical user interface elements. As described herein, the GUI element to be placed may be checked for conflicts with any GUI elements already part of a GUI design.

At block 612, conditions associated with the GUI element to be placed are displayed. As described herein, the displaying may include indicating locations not occupied by graphical user elements with a first color (e.g., green), indicating locations occupied by graphical user elements with a second color (e.g., yellow), and indicating locations of localization conflicts of graphical user elements with a third color (e.g., red). Embodiments may also indicate that a GUI element to be placed when localized will go off a screen or window area with a fourth color (e.g., blue).

Example Operating Environments

Figure 7:
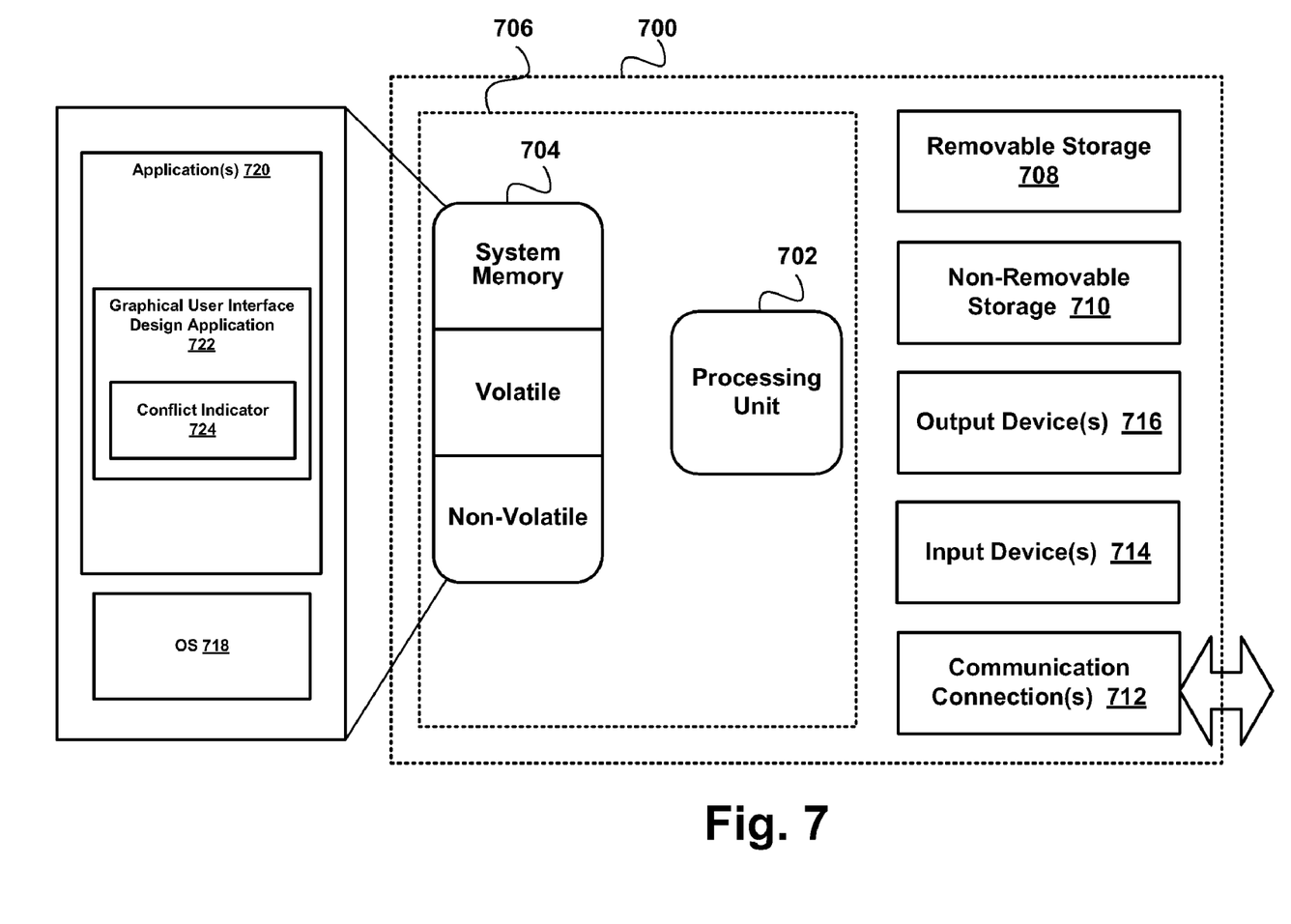
FIG. 7 is a block diagram of an exemplary computing system environment for implementing an embodiment.

With reference to FIG. 7, an exemplary system for implementing embodiments includes a general purpose computing system environment, such as computing system environment 700. Computing system environment 700 may include, but is not limited to, servers, desktop computers, laptops, tablet PCs, mobile devices, and smartphones. In its most basic configuration, computing system environment 700 typically includes at least one processing unit 702 and memory 704. Depending on the exact configuration and type of computing system environment, memory 704 may be volatile (such as RAM), non-volatile (such as ROM, flash memory, etc.) or some combination of the two. This most basic configuration is illustrated in FIG. 1 by dashed line 706.

System memory 704 may include, among other things, Operating System 718 (OS), application(s) 720, and graphical user interface design application 722. Graphical user interface design application 722 may facilitate design of a graphical user interface for an application. Graphical user interface design application 722 may further include conflict indicator 724. Conflict indicator 724 indicates conflict of graphical user interface elements within a graphical user interface. For example, conflict indicator 724 may provide indications of localization conflicts (e.g., overlap) or graphical user interface elements that when localized go off the screen or out of a window.

Additionally, computing system environment 700 may also have additional features/functionality. For example, computing system environment 700 may also include additional storage (removable and/or non-removable) including, but not limited to, magnetic or optical disks or tape. Such additional storage is illustrated in FIG. 1 by removable storage 708 and non-removable storage 710. Computer storage media includes volatile and nonvolatile, removable and non-removable media implemented in any method or technology for storage of information such as computer readable instructions, data structures, program modules or other data. Memory 704, removable storage 708 and nonremovable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 700. Any such computer storage media may be part of computing system environment 700.

Computing system environment 700 may also contain communications connection(s) 712 that allow it to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 712 may allow computing system environment 700 to communication over various networks types including, but not limited to, Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 712 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 700 may also have input device(s) 714 such as a keyboard, mouse, pen, voice input device, touch input device, remote control, etc. Output device(s) 716 such as a display, speakers, etc. may also be included. All these devices are well known in the art and need not be discussed at length here.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for indicating localization conflicts comprising:
    receiving information associated with a first graphical user interface element;
    receiving information associated with a second graphical user interface element;
    accessing localization data associated with said first graphical user interface element and said second graphical user interface element, wherein said localization data is operable to comprise information corresponding to one or more languages;
    determining if there is a conflict between said first graphical user interface element and said second graphical user interface element, wherein said conflict is based on said localization data and said determining is based on a growth in graphical user interface elements; and
    displaying an indication of the results of said determining of whether there is a conflict between said first graphical user interface element and said second graphical user interface element, wherein said displaying said indication is a portion of a graphical user interface design interface.

2. The method as recited in claim 1 wherein said information associated with said first graphical user interface element comprises placement information.

3. The method as recited in claim 1 wherein said information associated with said first graphical user interface element comprises alignment information.

4. The method as recited in claim 1 wherein said determining of a conflict is based on a horizontal localization conflict check.

5. The method as recited in claim 1 wherein said displaying comprises indicating a horizontal localization conflict on a vertical graphical user element.

6. The method as recited in claim 1 wherein said determining of a conflict is based on a vertical localization conflict check.

7. The method as recited in claim 1 wherein said displaying comprises indicating a vertical localization conflict on a horizontal graphical user element.

8. The method as recited in claim 1 wherein said first graphical user interface element comprises an image.

9. The method as recited in claim 1 wherein said first graphical user interface element comprises a label.

10. An apparatus for facilitating design of a graphical user interface comprising:
    a graphical user interface design module for presenting a graphical user interface for design of a graphical user interface for an application;
    a graphical user interface element information module for storing information associated with selected graphical user interface elements;
    a localization module for storing localization information associated with said selected graphical user interface elements, wherein said localization information is operable to comprise information corresponding to one or more languages;
    a conflict detection module for detecting localization conflicts between said selected graphical user interface elements, wherein a processor is operable to perform said detecting of localization conflicts wherein said detecting is based on a growth in graphical user interface elements; and
    a graphical user interface conflict indication module for indicating a conflict between selected graphical user interface elements, wherein said indication is a portion of said graphical user interface for design of said graphical user interface.

11. The apparatus as recited in claim 10 wherein said graphical user interface design module facilitates graphical user interface design via a master template.

12. The apparatus as recited in claim 10 wherein conflict detection module detects a conflict between a graphical user interface element and a master template graphical user interface element.

13. The apparatus as recited in claim 10 wherein said localization module facilitates display of graphical user interface element based on said localization information.

14. The apparatus as recited in claim 10 wherein said information associated with said selected graphical user interface elements comprises alignment data and coordinate data.

15. In a computer system having a graphical user interface including a display and a user interface selection device, a method of indicating usage of screen space, said method comprising:
    receiving a selection of a graphical user interface element to be placed;
    retrieving placement and alignment data corresponding to said graphical user interface element to be placed;
    retrieving localization data corresponding to said graphical user interface element to be placed, wherein said localization data is operable to comprise information corresponding to one or more languages;

comparing localization data corresponding to said graphical user interface element with localization data corresponding to already placed graphical user interface elements wherein said comparing is based on a growth in graphical user interface elements; and displaying conditions associated with said graphical user element to be placed, wherein displaying of said conditions is within a graphical user interface design interface.

16. The computer system of claim 15 wherein the method further comprising:

receiving one or more languages for use in localizing graphical user interface elements.

17. The computer system of claim 15 wherein said displaying comprises indicating locations not occupied by graphical user elements with a first color.

18. The computer system of claim 15 wherein said displaying comprises indicating locations occupied by graphical user elements with a second color.

19. The computer system of claim 15 wherein said displaying comprises indicating locations of localization conflicts of graphical user elements with a third color.

20. The computer system of claim 15 wherein said displaying comprises indicating a graphical user interface element to be placed when localized will go off a screen with a fourth color.

* * * * *